(12) United States Patent
Anderson et al.

(10) Patent No.: US 10,995,290 B2
(45) Date of Patent: May 4, 2021

(54) WAX FLOW VISCOSITY FOR FUELS

(71) Applicant: ExxonMobil Research and Engineering Company, Annandale, NJ (US)

(72) Inventors: Timothy J. Anderson, Chatham, NJ (US); Erin R. Fruchey, Philadelphia, PA (US); Suzanne R. Golisz, Annandale, NJ (US); Kenneth C. H. Kar, Philadelphia, PA (US); Sheryl B. Rubin-Pitel, Newtown, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 16/716,875

(22) Filed: Dec. 17, 2019

(65) Prior Publication Data
US 2020/0291317 A1    Sep. 17, 2020

Related U.S. Application Data

(60) Provisional application No. 62/816,642, filed on Mar. 11, 2019.

(51) Int. Cl.
*C10L 1/08*     (2006.01)
*G01N 11/00*    (2006.01)

(52) U.S. Cl.
CPC ............... *C10L 1/08* (2013.01); *G01N 11/00* (2013.01); *C10L 2200/0438* (2013.01); *C10L 2270/026* (2013.01); *G01N 2011/0093* (2013.01)

(58) Field of Classification Search
CPC .............. C10L 1/08; C10L 2270/026; C10L 2200/0438; G01N 11/00; G01N 2011/0093
See application file for complete search history.

(56) References Cited

U.S. PATENT DOCUMENTS

| | | | |
|---|---|---|---|
| 8,999,011 B2 * | 4/2015 | Stern ...................... | C10G 45/02 44/300 |
| 9,057,035 B1 | 6/2015 | Kraus et al. | |
| 2009/0178951 A1 * | 7/2009 | Balthasar ................ | C10L 1/14 208/15 |
| 2012/0246999 A1 | 10/2012 | Stern et al. | |
| 2015/0240174 A1 * | 8/2015 | Kraus ...................... | C10L 1/04 585/13 |

(Continued)

OTHER PUBLICATIONS

ISO 8217-2010 standards. (Year: 2010).*

(Continued)

*Primary Examiner* — Pamela H Weiss
(74) *Attorney, Agent, or Firm* — Robert A. Migliorini (57) ABSTRACT

Marine fuel compositions that are low sulfur and have improved wax flow viscosity are disclosed. An example marine fuel composition may have the following enumerated properties: a sulfur content of about 0.50% or less by weight of the marine fuel composition; a density at 15° C. of about 0.86 g/cm³ to about 1.01 g/cm³; a kinematic viscosity at 50° C. of about 1 centistoke to about 700 centistokes; and a ratio of kinematic viscosity to wax flow viscosity of greater than 1, wherein the wax flow viscosity is determined using a minimum operating viscosity of about 8 centistokes at 50° C.

12 Claims, 2 Drawing Sheets

(56) References Cited

U.S. PATENT DOCUMENTS

2015/0340126 A1* 11/2015 Kimura .................. H01B 3/441
  174/110 A
2017/0002273 A1* 1/2017 Rubin-Pitel ............... C10L 1/06
2017/0044451 A1 2/2017 Kar et al.

OTHER PUBLICATIONS

Ciumac Guidline Jan. 2015 Cold Flow Properties of Marine Fuel Oils (Year: 2015).*
Unplugging marine fuel waxing issues Diesel and Gas Turbine Worldwide (Year: 2016).*
The International Search Report and Written Opinion of PCT/US2019/066753 dated Jul. 2, 2020.

* cited by examiner

FIG.1

FIG. 2

WAX FLOW VISCOSITY FOR FUELS

CROSS REFERENCE TO RELATED APPLICATIONS

This application claims priority to U.S. Provisional Application Ser. No. 62/816,642 filed Mar. 11, 2019 which is herein incorporated by reference in its entirety.

FIELD

This application relates to marine fuel compositions and, more particularly, embodiments relate to marine fuel compositions that are low sulfur and have improved wax flow viscosity.

BACKGROUND

Marine fuel compositions, sometimes referred to as bunker fuel, have conventionally included heavy gas oils that may be otherwise difficult and/or expensive to convert to a beneficial use. The heavy gas oils may include heavier distillation fractions that are lightly processed (or even unprocessed), such as vacuum gas oils, heavy atmospheric gas oil, and residual components. Due in part to use of the marine fuel compositions in international waters, the fuels have typically incorporated heavy gas oils with relatively high sulfur content. However, many countries have recently adopted local specifications for lower sulfur emissions from marine vessels. In addition, the International Maritime Organization is implementing a new global sulfur limit of 0.50 wt. % sulfur, effective Jan. 1, 2020, commonly referred to as "IMO 2020."

In preparing low-sulfur fuels that are IMO 2020 compliant, different hydrocarbon components can be blended. These different hydrocarbon components can include wax, such as paraffin wax, as a byproduct of the refining process. Since wax can be problematic, there is a need to manage wax content when making IMO 2020 compliant marine fuel compositions. For example, solid wax in the marine fuel compositions can lead to filter blocking in the fuel handling system and starve the engine of fuel. If solid wax is present, the marine fuel compositions may be heated to melt any wax prior to injection into the engine. However, engine manufacturers also specify a viscosity at which the marine fuel composition should be injected into the engine. Raising the temperature of the fuel to melt the wax may result in too low of a viscosity.

SUMMARY

Disclosed herein is an example marine fluid composition having low sulfur content. The marine fuel composition may have the following enumerated properties: a sulfur content of about 0.50% or less by weight of the marine fuel composition; a density at 15° C. of about 0.86 g/cm³ to about 1.01 g/cm³; a kinematic viscosity at 50° C. of about 1 centistoke to about 700 centistokes; and a ratio of kinematic viscosity to wax flow viscosity of greater than 1, wherein the wax flow viscosity is determined using a minimum operating viscosity of about 8 centistokes at 50° C.

Further disclosed herein is a method of blending marine fuel compositions. The method may include blending two or more hydrocarbon components to prepare a liquid fuel, wherein the liquid fuel has the following enumerated properties: a sulfur content of about 0.50% or less by weight of the marine fuel composition; a density at 15° C. of about 0.86 g/cm³ to about 1.01 g/cm³; a kinematic viscosity at 50° C. of about 1 centistoke to about 700 centistokes; and a ratio of kinematic viscosity to wax flow viscosity of greater than 1, wherein the wax flow viscosity is determined using minimum operating viscosity of about 8 centistokes at 50° C.

Further disclosed herein is a method for evaluating marine fuel compositions. The example method may include measuring a wax endpoint temperature for a marine fuel composition. The example method may further include identifying a minimum operational viscosity for use of the marine fuel composition. The example method may further include converting the minimum operational viscosity at the wax endpoint temperature to an estimated kinematic viscosity at 50° C. to define a wax flow viscosity.

BRIEF DESCRIPTION OF THE DRAWINGS

These drawings illustrate certain aspects of the present invention and should not be used to limit or define the invention.

DESCRIPTION

In various embodiments, the present disclosure may include marine fuel compositions that are low sulfur and have improved wax flow viscosity. Embodiments disclosed herein may use wax flow viscosity to provide marine fuel compositions with essentially no solid wax in the marine fuel composition as it is being injected into the engine that also meet viscosity requirements of the engine manufacturer. As used herein, the term "wax flow viscosity" refers to the minimum kinematic viscosity at about 50° C. necessary to ensure that essentially all the wax in the marine fuel composition is melted prior to fuel injection at a minimum operational viscosity as specified by an engine manufacturer. Essentially all the wax is considered to be melted where about 98 wt. % or more of the wax in the marine fuel composition is melted.

As described above, many countries have adopted local specifications for lower sulfur emissions from marine vessels. Even further, IMO 2020 is requiring development of new marine fuel compositions that are low sulfur to meet the new sulfur requirements that are being implemented on Jan. 1, 2020. In addition to IMO 2020, marine fuel compositions classified as residual marine fuels must meet the requirements of ISO 8217, Fuel Standard Sixth Edition 2017, Table 2, while marine fuel compositions classified as distillate marine fuels must meet the requirements of ISO 8217, Fuel Standard Sixth Edition 2017, Table 1.

To provide marine fuel compositions that are low sulfur, embodiments may include blending conventional hydrocarbon components, such as heavy gas oils, that are typically higher in sulfur content with lighter gas oils that are typically lower in sulfur content. While this can provide marine fuel compositions with desirable sulfur concentrations, embodiments may further include monitoring the viscosity and wax content of the marine fuel compositions to ensure adequate flowability without undesirable wax levels. For example, the heavy gas oils typically have a high viscosity while the lighter gas oils typically have a low viscosity. The use of the lighter gas oils that are low sulfur in embodiments of the marine fuel compositions can reduce the viscosity of the marine fuel composition to levels that may be lower than conventional marine fuel compositions.

Examples of suitable marine fuel compositions may include a hydrocarbon component or blend of two or more hydrocarbon components such that the marine fuel compositions have the properties enumerated herein, such as one or more of sulfur content, density, kinematic viscosity at about 50° C. ("KV50"), ratio of KV50 to wax flow viscosity, and wax endpoint temperature. By way of example, a marine fuel composition may include a heavy gas oil and/or a lighter gas oil. The heavy gas oil typically may include long-chain paraffinic molecules that can form a solid wax at moderate temperatures, such as ambient to about 130° C. In addition, to problems with wax formation, the heavy gas oils are also typically lightly (or even unprocessed) so can contain higher sulfur content. To provide the requisite sulfur levels and acceptable wax flow viscosities, the heavy gas oil can be blended with the lighter gas oil. In some embodiments, the composition of the components of the marine fuel compositions and their relative proportions can be selected to provide a marine fuel composition having the properties enumerated herein.

Heavy gas oil may be defined as a hydrocarbon fraction in which at least 50 vol. % boils at about 500° C. to about 750° C. (as measured by ASTM D86-18) at atmospheric pressure, for example, about 550° C. to about 650° C. or about 575° C. to about 625° C. Boiling ranges in weight percent may also be determined using the measurement technique described in ASTM D2887-18, ASTM D6352-15, or ASTM D7169-18. Additional properties that can characterize heavy gas oils, include, but are not limited to, density and KV50. In some embodiments, the heavy gas oil may have a density in g/cm$^3$ of about 0.93 to about 1.0, for example about 0.95 to about 1, or about 0.93 to about 0.95. In some embodiments, the heavy gas oil may have a KV50 in centistokes ("cSt") of about 30 or greater, for example about 30 to about 2,500,000, about 30 to about 100, about 100 to about 10,000, or about 500 to about 1,000. In some embodiments, the heavy gas oil may have a high sulfur content. For example, the heavy gas oil may have a sulfur content in wt. % of greater than about 0.10, for example about 0.10 to about 5, about 0.50 to about 3, or about 1 to about 2.5. Examples of suitable heavy gas oils may include a variety of different hydrocarbon fractions including, but not limited to, distillates and residues, such as heavy atmospheric gas oil, vacuum gas oil, vacuum residuals from fractionating (total/partial) crude oils, atmospheric residuals from fractionating (total/partial) crude oils, visbreaker residuals, deasphalted residuals, and slurry oil, among others. One of ordinary skill in the art, with the benefit of this disclosure, should be able to select an appropriate heavy gas oil for a particular application.

Lighter gas oils are referred to herein as "lighter" because they have a reduced boiling point than the previously described heavy gas oil. The lighter gas oils may be defined as a hydrocarbon fraction in which at least 50 vol. % boils at about 200° C. to about 550° C. (as measured by ASTM D 86-18) at atmospheric pressure, for example, about 200° C. to about 400° C. or about 200° C. to about 350° C. Boiling ranges in weight percent may also be determined using the measurement technique described in ASTM D2887-18. Additional properties that can characterize lighter gas oils, include, but are not limited to, density and KV50. In some embodiments, the lighter gas oil may have a density in g/cm$^3$ of about 0.8 to about 1.0, for example about 0.8 to about 0.9, about 0.83 to about 0.87, or about 0.9 to about 1. In some embodiments, the lighter gas oil may have a KV50 in cSt of about 1 to about 30, for example about 1 to about 20, about 1 to about 10, about 1 to about 5, about 10 to about 20, or about 15 to about 20. In some embodiments, the lighter gas oil may have a low sulfur content, such that when blended with the heavy gas oil, the marine fuel composition may be considered IMO 2020 compliant. For example, the lighter gas oil may have a sulfur content in wt. % of less than about 0.05, for example, about 0.05 to about 0.0001, about 0.1 to about 0.0001, or about 0.001 to about 0.0005. Examples of suitable lighter gas oils may include a variety of different hydrocarbon fractions including, but not limited to, light atmospheric gas oil from the atmospheric tower in fractionating (total/partial) crude oil, automotive fuel oil, or hydrocarbon fractions from the catalytic cracker main fractionator. A specific example of a lighter gas oil may include diesel, such as ultra-low-sulfur diesel, which is defined by the Environmental Protection agency to have a maximum sulfur content of 15 parts per million.

The heavier gas oils and/or the lighter gas oils may be included in the marine fuel compositions in any suitable concentration, to provide the marine fuel composition with desirable properties. For example, the heavier gas oil may be included in an amount of 1 vol. % to 90 vol. %, for example, about 1 vol. % to about 60 vol. %, about 1 vol. % to about 30 vol. %, about 1 vol. % to about to 10 vol. %, about 1 vol. % to about 5 vol. %, about 1 vol. % to about 3 vol. %, about 3 vol. % to about 90 vol. %, about 5 vol. % to about 90 vol. %, about 10 vol. % to about 90 vol. %, about 30 vol. % to about 90 vol. %, about 60 vol. % to about 90 vol. %, or about 80 vol. % to about 80 vol. %. By way of further example, the lighter gas oil may be included in an amount of 10 vol. % to 99 vol. %, for example, about 10 vol. % to about 90 vol. %, about 10 vol. % to about 60 vol. %, about 10 vol. % to about 30 vol. %, about 20 vol. % to about 99 vol. %, about 30 vol. % to about 99 vol. %, about 60 vol. % to about 99 vol. %, or about 90 vol. % to about 99 vol. %. One of ordinary skill in the art with the benefit of this disclosure should be able to select an appropriate amount of the heavier gas oils and/or the lighter gas oils to include in the marine fuel compositions for a particular application.

In some embodiments, viscosity of the marine fuel compositions may be monitored to ensure compliance with viscosity requirements from the engine manufacturers. Typically, engine manufacturers will specify a viscosity range at which a marine fuel composition should be injected into the marine engine. This viscosity requirement for injection may range, for example, from about 2 cSt to about 20 cSt, regardless of temperature. For example, the engine manufacturer may specify that the marine fuel should be injected at a kinematic viscosity ranging from about 12 cSt to about 18 cSt at ambient temperature in the engine room (e.g., 35° C. to 40° C.). This example range corresponds to a minimum kinematic viscosity at 50° C. of 8 cSt for residual marine fuel. To meet the desired viscosity range, the temperature of the marine fuel composition may be modulated. For example, high viscosity marine fuel compositions may be heated to reduce the viscosity to meet the viscosity range, while low viscosity marine fuel compositions may be cooled to increase the viscosity.

In some embodiments, the wax content of the marine fuel compositions may be monitored to ensure that there is essentially no solid wax present when injected into the engine. As previously described, solid wax in the marine fuel composition can lead to filter blocking in the fuel handling system, thus potentially starving the engine of fuel. If solid wax is present in the marine fuel composition, embodiments may include increasing the temperature at which the marine fuel composition may be injected into the engine so that essentially all the wax would be melted and in the liquid phase prior to injection. However, with hydrocarbon components in the marine fuel composition that are low sulfur and low viscosity to reach the new sulfur requirements, the overall viscosity of the marine fuel composition may be lower such that raising the temperature to reduce solid wax may result in too low of viscosity. Accordingly, embodiments may include using wax flow viscosity to provide a marine fuel composition with an acceptable viscosity that also has acceptable wax levels. For example, a ratio of kinematic viscosity to wax flow viscosity may be specified that provides acceptable viscosity and wax levels in the marine fuel compositions.

Based on the relationship between viscosity and wax content for embodiments of the marine fuel compositions having low sulfur content, various desirable properties for a fuel oil composition may be specified. Examples of suitable marine fuel compositions may be enumerated by the following properties: (i) a sulfur content of about 0.50 wt. % or less; (ii) a density at 15° C. of about 0.86 g/cm$^3$ to about 1.01 g/cm$^3$; (iii) a kinematic viscosity at 50° C. ("KV50") of about 10 cSt to about 700 cSt; and (iv) a ratio of KV50 to wax flow viscosity of greater than 1.

One property that can be used for selection and/or modification of embodiments of the marine fuel compositions is sulfur content. By way of example, the marine fuel compositions may be considered IMO 2020-compliant in that embodiments of the marine fuel oil compositions have a sulfur content of about 0.50 wt. % or less. Examples of suitable marine fuel compositions may have a sulfur content of about 0.0001 wt. % to about 0.50 wt. %, for example, about 0.0001 wt. % to about 0.05 wt. %, about 0.01 wt. % to about 0.1 wt. %, about 0.05 wt. % 0.50 wt. %, or about 0.4 wt. % to about 0.49 wt. %. Specific examples of suitable marine fuel compositions may have a sulfur content of about 0.0001 wt. %, about 0.001 wt. %, 0.005 wt. %, about 0.01 wt. %, about 0.02 wt. % about 0.03 wt. %, about 0.05 wt. %, 0.1 wt. %, about 0.2 wt. %, about 0.3 wt. %, about 0.4 wt. %, about 0.45 wt. %, about 0.49 wt. %, or about 0.50 wt. %. One of ordinary skill in the art, with the benefit of this disclosure, should be able to select an appropriate sulfur content for embodiments of the marine fuel compositions, as desired for a particular application.

Another property that can be used for selection and/or modification of embodiments of the marine fuel compositions is density. The standardized test method in ISO 3675 (Jun. 15, 1998) is defined as providing the procedure for determination of density. In some embodiments, a marine fuel composition may have a density at 15° C. of about 0.86 g/cm$^3$ to about 1.01 g/cm$^3$. For example, the density at 15° C. of the marine fuel composition may be about 0.86 g/cm$^3$ to about 1.0 g/cm$^3$, about 0.86 g/cm$^3$ to about 0.98 g/cm$^3$, 0.86 g/cm$^3$ to about 0.97 g/cm$^3$, about 0.86 g/cm$^3$ to about 0.93 g/cm$^3$, about 0.86 g/cm$^3$ to about 0.9 g/cm$^3$, 0.86 g/cm$^3$ to about 0.89 g/cm$^3$, about 0.9 g/cm$^3$ to about 1.01 g/cm$^3$, about 0.9 g/cm$^3$ to about 0.95 g/cm$^3$, about 0.94 g/cm$^3$ to about 1.01 g/cm$^3$, about 0.98 g/cm$^3$ to about 1.01 g/cm$^3$, or about 1.0 g/cm$^3$ to about 1.01 g/cm$^3$. Specific examples of suitable marine fuel compositions may have a density at 15° C. of about 0.86 g/cm$^3$, about 0.87 g/cm$^3$, about 0.88 g/cm$^3$, about 0.89 g/cm$^3$, about 0.9 g/cm$^3$, about 0.91 g/cm$^3$, about 0.92 g/cm$^3$, about 0.93 g/cm$^3$, about 0.94 g/cm$^3$, about 0.95 g/cm$^3$, about 0.96 g/cm$^3$, about 0.97 g/cm$^3$, about 0.98 g/cm$^3$, about 0.99 g/cm$^3$, about 1 g/cm$^3$, or about 1.01 g/cm$^3$. One of ordinary skill in the art, with the benefit of this disclosure, should be able to select an appropriate density for embodiments of the marine fuel compositions, as desired for a particular application.

Yet another property that can be used for selection and/or modification of embodiments of the marine fuel compositions is KV50. The standardized test method in ISO 3104 (1997) is defined as providing the procedure for determining KV50. In some embodiments, a marine fuel composition may have a KV50 of about 1 cSt to about 700 cSt, for example, about 1 cSt to about 650 cSt, about 1 cSt to about 600 cSt, about 1 cSt to about 550 cSt, about 1 cSt to about 500 cSt, about 1 cSt to about 450 cSt, about 1 cSt to about 400 cSt, about 1 cSt to about 350 cSt, about 1 cSt to about 300 cSt, about 1 cSt to about 250 cSt, about 1 cSt to about 200 cSt, about 1 cSt to about 150 cSt, about 1 cSt to about 100 cSt, about 1 cSt to about 80 cSt, about 1 cSt to about 60 cSt, about 1 cSt to about 40 cSt, about 1 cSt to about 20 cSt, about 10 cSt to about 700 cSt, about 50 cSt to about 700 cSt, about 100 cSt to about 700 cSt, about 150 cSt to about 700 cSt, about 200 cSt to about 700 cSt, about 250 cSt to about 700 cSt, about 300 cSt to about 700 cSt, about 350 cSt to about 700 cSt, about 400 cSt to about 700 cSt, about 450 cSt to about 700 cSt, about 500 cSt to about 700 cSt, about 550 cSt to about 700 cSt, about 600 cSt to about 700 cSt, about 650 cSt to about 700 cSt. Specific examples of suitable marine fuel oil compositions may have a KV50 of about 1 cSt, about 5 cSt, about 10 cSt, about 50 cSt, about 100 cSt, about 150 cSt, about 200 cSt, about 250 cSt, about 300 cSt, about 350 cSt, about 380 cSt, about 400 cSt, about 450 cSt, about 500 cSt, about 550 cSt, about 600 cSt, about 650 cSt, or about 700 cSt. In some embodiments, the marine a marine fuel composition may have a KV50 of about 700 cSt or less, about 600 cSt or less, about 400 cSt or less, about 200 cSt or less, or about 100 cSt or less. In accordance with some embodiments, selection and/or modification of an appropriate KV50 in combination with wax flow viscosity provide an ability for the marine fuel compositions to meet viscosity requirements from engine manufacturers while also being essentially free of solid wax during injection into the engine. One of ordinary skill in the art, with the benefit of this disclosure, should be able to select an appropriate KV50 for embodiments of the marine fuel compositions, as desired for a particular application.

Yet another property that can be used for selection and/or modification of embodiments of the marine fuel compositions is ratio of KV50 to wax flow viscosity. It has been determined that there is relationship between wax flow viscosity and KV50. In accordance with certain embodiments, marine fuel compositions with an acceptable wax flow viscosity have a KV50 that is greater than the wax flow viscosity. By way of example, if the KV50 of the marine fuel composition is greater than the wax flow viscosity, then essentially all the wax should be melted at injection temperature. In other words, essentially all the wax in the marine fuel composition should be in a liquid state as it is being injected into the engine, thus reducing problems causes by solid wax blocking the fuel filters. In some embodiments, a marine fuel composition may have a ratio of KV50 to wax flow viscosity greater than 1. By way of example, the marine fuel composition may have a ratio of KV50 to wax flow viscosity of about 1.01 to about 25, for example, about 1.5 to about 25, about 2 to about 25, about 5 to about 25, about 10 to about 25, about 15 to about 25, about 20 to about 25, about 1.01 to about 25, about 1.01 to about 20, about 1.01 to about 15, about 1.01 to about 10, about 1.01 to about 5, about 2 to about 25, about 2 to about 20, about 2 to about 15, about 2 to about 10, about 2 to about 5, about 5 to about 20, about 5 to about 15, about 5 to about 10, about 10 to about 20, or about 10 to about 15. Specific examples of suitable marine fuel compositions may have a ratio of KV50 to wax flow viscosity of about 1.01, about 1.5, about 2, about 2.5, about 3, about 4, about 5, about 10, about 15, about 20, or about 25. In accordance with some embodiments, selection and/or modification of the ratio of KV50 to wax flow viscosity can provide an ability for the marine fuel compositions to meet viscosity requirements from engine manufacturers while also being essentially free of solid wax during injection into the engine. One of ordinary skill in the art, with the benefit of this disclosure, should be able to select a ratio of KV50 to wax flow viscosity for embodiments of the marine fuel compositions, as desired for a particular application.

As previously described, the wax flow viscosity of a marine fuel composition is the minimum kinematic viscosity at about 50° C. necessary to ensure that essentially all the wax is melted prior to fuel injection at a minimum operational viscosity as specified by an engine manufacturer. Engine manufacturers may specify different viscosity ranges at which a marine fuel composition should be injected into the marine engine. This viscosity requirement for injection may range, for example, from about 2 cSt to about 20 cSt, regardless of temperature. For example, the engine manufacturer may specify that the marine fuel viscosity should be injected at a kinematic viscosity ranging from about 12 cSt to about 18 cSt at ambient temperature in the engine room (e.g., 35° C. to 40° C.), thus providing a minimum kinematic viscosity at the ambient temperature of 12 cSt, which corresponds to KV50 of 8 cSt.

A technique for determining wax flow viscosity will now be described. The method described herein is defined as providing the procedure for determining wax flow viscosity. The method includes determining a wax endpoint temperature for a marine fuel composition, identifying a minimum operational viscosity for use of the marine fuel composition, which may be required by the engine manufacturer, converting the minimum operational viscosity at the wax endpoint temperature to an estimated KV50, which is the wax flow viscosity; and rejecting the marine fuel composition if the ratio of the measured KV50 of the marine fuel composition to wax flow viscosity is less than 1. Should this ratio be the measured KV50 of the marine fuel composition or be greater than 1, then the marine fuel composition may have an acceptable wax flow viscosity, indicating that essentially all the wax will be melted during injection into the engine while having an acceptable kinematic viscosity.

Figure 1:
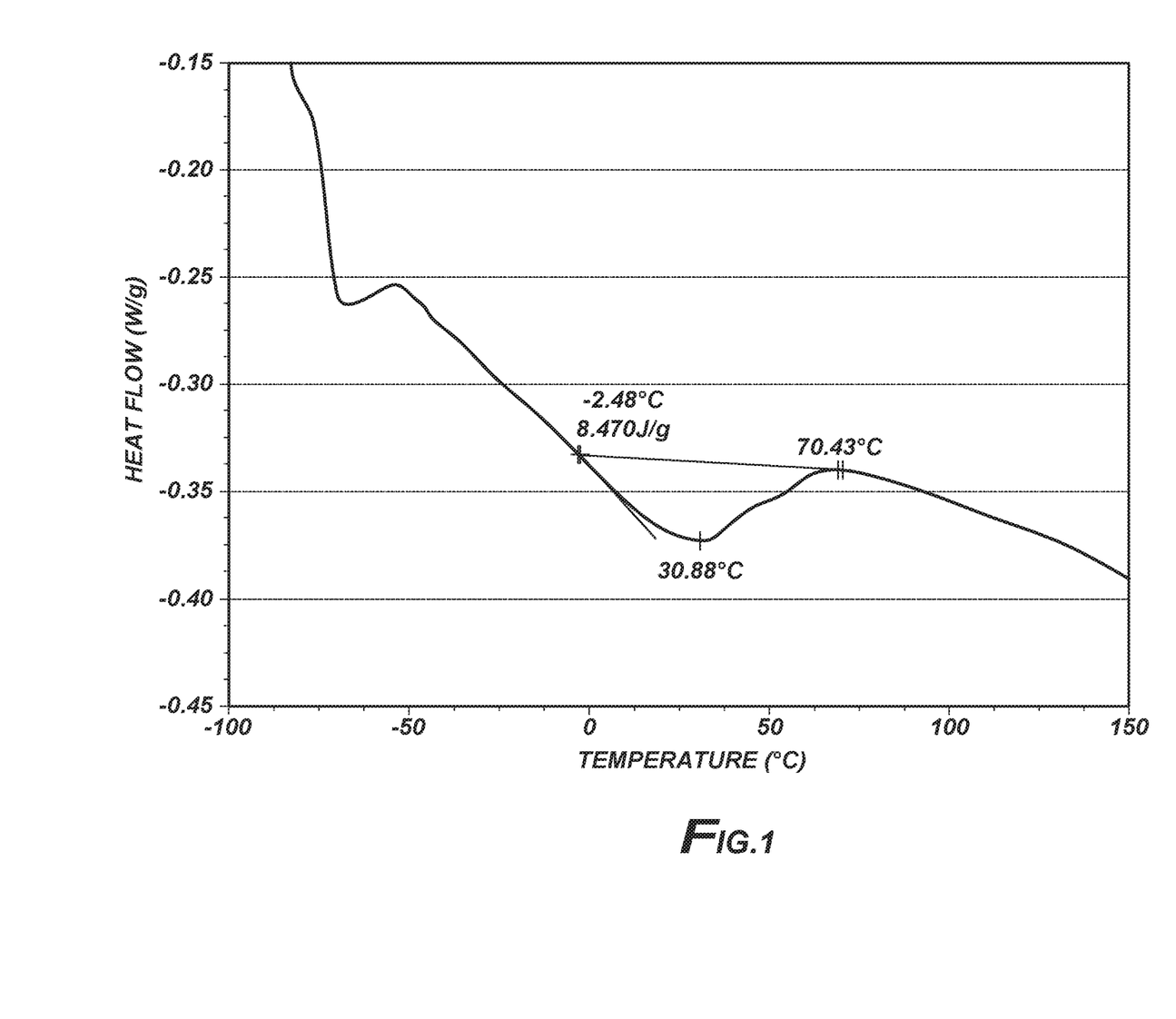
FIG. 1 illustrates a prophetic graph of temperature versus heat flow for a marine fuel composition.

In determining the wax flow viscosity, the method includes determining a wax endpoint temperature. As used herein, the term "wax endpoint temperature" refers to the temperature at which essentially all (98 wt. % or more) of the wax is melted at atmospheric pressure. Determining the wax endpoint can include measuring the temperature profile of the marine fuel composition. By way of example, the temperature profile may be measured using differential scanning calorimetry ("DSC") in which the difference in the amount of heat required to increase the temperature of a sample is measured as a function of temperature. The DSC may be performed, for example, in accordance with any suitable technique, including, but not limited to, ASTM D4419-90 (2015). In some embodiments, the wax endpoint point may be determined based on the DSC. Embodiments may use a heat flow or a heat flux DSC. The heat flow or heat flux determined from the DSC may be provided as function of temperature. FIG. 1 is an illustrative plot of heat flow as a function of temperature for a heat flow DSC. The plot is a prophetical example of an illustrative plot determining the wax endpoint temperature. On FIG. 1, the heat flow is plotted as a function of temperature, shown as curve 100. The point where curve 100 reaches an asymptote and returns to the baseline is the wax endpoint temperature. On FIG. 1, the wax endpoint temperature is about 70.43° C. The area under the line bounded by the curve 100 represents the wax content.

In determining wax flow viscosity, the method includes identifying a minimum operational viscosity required by the engine manufacturer. As previously described, engine manufacturers may specify different viscosity ranges at which a marine fuel composition should be injected into the marine engine. This viscosity requirement for injection may range, for example, from about 2 cSt to about 20 cSt, regardless of temperature For example, the engine manufacturer may specify that the marine fuel viscosity should be injected at a kinematic viscosity of about 12 cSt to about 18 cSt at ambient temperature in the engine room (e.g., 35° C. to 40° C.), thus providing a minimum kinematic viscosity at the ambient temperature of 12 cSt, which corresponds to KV50 of 8 cSt.

In determining wax flow viscosity, the method includes estimating the wax flow viscosity based on the wax endpoint temperature and the minimum operational viscosity. In some embodiments, the minimum operational viscosity at the wax endpoint temperature may be converted to an estimated KV50, which is the wax flow viscosity. Any suitable technique may be used for this conversion of the minimum operational viscosity at the wax endpoint temperature to the estimated KV50 (wax flow viscosity). For example, there are known relationships between viscosity and temperature for most grades of fuel, such as distillate and residual marine fuels, that can be used for this conversion. The marine fuel composition should have a measured KV50. Should the measured KV50 of the marine fuel composition be greater than the estimated or wax flow viscosity (i.e., a ratio of measured KV50 to wax flow viscosity of greater than 1), then the marine fuel composition may have an acceptable wax flow viscosity, indicating that essentially all the wax will be melted during injection into the engine while having an acceptable kinematic viscosity. However, should this ratio of measured KV50 to wax flow viscosity be less than 1, the marine fuel composition may be rejected. Remedial steps may be taken to adjust the wax flow viscosity to provide an acceptable wax flow viscosity. For example, the concentration of one or more components in the marine fuel composition may be adjusted. Alternatively, one or more additional hydrocarbon components may be added to the marine fuel composition.

In addition to the previously described properties, the wax endpoint temperature is another property that can be used for selection and/or modification of embodiments of the marine fuel compositions. As previously described, the "wax endpoint temperature" is the temperature at which essentially all (98 wt. % or more) of the wax in the marine fuel composition is melted. In some embodiments, a marine fuel composition may have a wax endpoint temperature of about 35° C. to about 130° C., for example about 35° C. to about 120° C., about 35° C. to about 110° C., about 35° C. to about 100° C., about 35° C. to about 90° C., about 35° C. to about 80° C., about 35° C. to about 70° C., about 35° C. to about 60° C., about 35° C. to about 50° C., about 35° C. to about 40° C., about 40° C. to about 130° C., about 50° C. to about 130° C., about 60° C. to about 130° C., about 70° C. to about 130° C., about 80° C. to about 130° C., about 90° C. to about 130° C., about 100° C. to about 130° C., about 110° C. to about 130° C., about 120° C. to about 130° C., about 40° C. to about 120° C., about 40° C. to about 110° C., about 40° C. to about 100° C., about 40° C. to about 90° C., about 40° C. to about 80° C., about 40° C. to about 70° C., about 40° C. to about 60° C., or about 40° C. to about 40° C. Specific examples of suitable marine fuel oil compositions may have a wax endpoint temperature of about 35° C., about 40° C., about 50° C., about 50° C., about 70° C., about 80° C., about 90° C., about 100° C., about 110° C., about 120° C., or about 130° C. In accordance with some embodiments, selection and/or modification of an appropriate wax endpoint temperature in combination with KV50 and wax flow viscosity provide an ability for the marine fuel compositions to meet viscosity requirements from engine manufacturers while also being essentially free of solid wax during injection into the engine. One of ordinary skill in the art, with the benefit of this disclosure, should be able to select an appropriate wax endpoint temperature for embodiments of the marine fuel compositions, as desired for a particular application.

EXAMPLES

To facilitate a better understanding of the present invention, the following examples of certain aspects of some embodiments are given. In no way should the following examples be read to limit, or define, the entire scope of the invention. ASTM Test Method D341 was used as the reference for the correlation between viscosity and temperature.

Example 1

In this example, ten different heavy gas oils and ten different lighter gas oils were used to prepare several different sample marine fuel compositions, identified as Fuels 1-27. Table 1 below shows the properties of the different heavy and lighter gas oils used in this example, identified as LGOs and HGOs. Table 2 below shows the properties of the sample marine fuel compositions with acceptable wax flow viscosities (i.e., a ratio of KV50 to wax flow viscosity of greater than 1). As illustrated, Fuels 1-19 have a KV50 that is greater than the wax flow viscosity, indicating an acceptable wax flow viscosity. Table 3 below shows the properties of the different sample marine fuel compositions with unacceptable wax flow viscosities. As illustrated, Fuels 20-27 have a KV50 that is less than the wax flow viscosity, indicating an unacceptable wax flow viscosity.

TABLE 1

| Blend Component | Density, g/cm³ | Viscosity at 50° C., cSt | Sulfur, wt. % | Distillation T10, ° C. | Distillation T50, ° C. | Distillation T90, ° C. | Distillation Method | Wax content (wt. %) | Wax Endpoint, ° C. (0% residual wax) | Wax Flow Viscosity (predicted), cSt |
|---|---|---|---|---|---|---|---|---|---|---|
| LGO A1 | 0.8749 | 18.62 | 0.0005 | 306.2 | 376.2 | 399.9 | D86 | | 35 | |
| LGO A2 | 0.9236 | 48.2 | 0.3144 | 339 | 466 | 632 | D7169 | | not tested | |
| LGO A3 | 0.9068 | 64.3 | 0.2284 | 339 | 466 | 632 | D7169 | 2.5 | 64 | 18.3 |
| LGO B1 | 0.8390 | 1.9 | 0.0053 | 201 | 250.8 | 324 | D86 | | not tested | |
| LGO B2 | 0.8500 | 2.60 | 0.004 | 224.5 | 280.5 | 347.1 | D2887 | 10.5 | 20 | 5.3 |
| LGO B3 | 0.8548 | 4.27 | 0.0526 | 229 | 325 | 400 | D86 | | not tested | |
| LGO C1 | 0.9985 | 2.00 | 1.13 | 222 | 243 | 289 | D86 | | not tested | |
| LGO C2 | 0.9795 | 8.89 | 1.15 | 320.6 | 346.9 | 370.7 | D86 | | not tested | |
| LGO C3 | 0.9393 | 19.60 | 0.77 | 359.5 | 419 | 460.5 | D2887 | 8.6 | 50 | 12 |
| LGO C4 | 0.8830 | 1.691 | 0.098 | 204 | 262.4 | 318.7 | D86 | 1.65 | 1 | 3.4 |
| HGO A1 | 1.0000 | 200000 | 1.2 | not tested | not tested | not tested | | | not tested | |
| HGO A2 | 0.9732 | 593.70 | 1.34 | 326 | 582 | 727 | D2887 | | 105 | |
| HGO A3 | 0.9328 | 575 | 0.5109 | 324 | 610 | 731 | D7169 | | not tested | |
| HGO A4 | 0.9715 | 1878 | 0.71 | not tested | not tested | not tested | | | not tested | |
| HGO A5 | 0.9395 | 941 | 0.68 | 299 | 607 | 705 | D6352 | | not tested | |
| HGO A6 | 0.9779 | 3020 | 2.38 | 476 | 613 | 729 | D2887 | | 104 | |
| HGO A7 | 1.004 | 708432 | 0.81 | 569 | 659 | | D6352 | | not tested | |
| HGO B1 | 0.9359 | 25.51 | 0.17 | 351 | 440 | | D86 | 13.5 | 49 | 11.6 |
| HGO B2 | 0.9227 | 25.68 | 0.14 | 350 | 424.5 | | D86 | 14.3 | 50 | 12 |
| HGO B3 | 0.9924 | 50.00 | 1.7 | not tested | not tested | not tested | | 6.6 | 62 | 17.2 |

TABLE 2

| Fuel | Blend Recipe, vol % | Density @ 15° C., g/cm³ | Sulfur, wt % | Viscosity KV50, cSt | Wax content (wt %) | Wax Endpoint, ° C. (0% residual wax) | Wax Flow Viscosity (predicted), cSt | Ratio of KV50 to Wax Flow Viscosity |
|---|---|---|---|---|---|---|---|---|
| Fuel 1 | HGO A4, 58 LGO B1, 42 | 0.9019 | 0.4249 | 30.3 | 1.8 | 80 | 29.6 | 1.02 |
| Fuel 2 | HGO A5, 68 LGO B1, 32 | 0.9069 | 0.484 | 53.7 | 2.3 | 83 | 34.5 | 1.56 |
| Fuel 3 | HGO A1, 41 LGO B2, 30 LGO C3, 22 | 0.9434 | 0.85 | 66.8 | | 99 | 62 | 1.08 |
| Fuel 4 | HGO A6, 67.3 LGO C1, 12 | 0.9492 | 1.8 | 72 | | 100 | 65 | 1.11 |
| Fuel 5 | HGO A2, 1.36 LGO A1, 76 LGO B3, 22 LGO C2, 0.64 | 0.8745 | 0.0351 | 11.51 | | 35 | 8 | 1.44 |
| Fuel 6 | HGO A2, 1.36 LGO A1, 98 LGO C2, 0.64 | 0.88 | 0.034 | 20.18 | | 35 | 8 | 2.52 |

TABLE 2-continued

| Fuel | Blend Recipe, vol % | Density @ 15° C., g/cm$^3$ | Sulfur, wt % | Viscosity KV50, cSt | Wax content (wt %) | Wax Endpoint, ° C. (0% residual wax) | Wax Flow Viscosity (predicted), cSt | Ratio of KV50 to Wax Flow Viscosity |
|---|---|---|---|---|---|---|---|---|
| Fuel 7 | HGO A2, 3.4 LGO A1, 58 LGO B3, 18 LGO C2, 20.6 | 0.8973 | 0.339 | 11.61 | | 35 | 8 | 1.45 |
| Fuel 8 | LGO A1, 100 | 0.8749 | 0.0005 | 18.62 | | 35 | 8 | 2.33 |
| Fuel 9 | HGO A1, 37.2 HGO B3, 14 LGO B2, 35.78 LGO C3, 10.54 | 0.9396 | | 50.91 | 5.7 | 81 | 34.8 | 1.46 |
| Fuel 10 | HGO A1, 48 LGO B2, 35.2 LGO C3, 13.6 | 0.9425 | | 88.15 | 5.54 | 89 | 53.1 | 1.66 |
| Fuel 11 | HGO A6, 75 LGO B3, 25 LGO B2, 5 | 0.9332 | 1.15 | 79.8 | | 96 | 48 | 1.66 |
| Fuel 12 | HGO A7, 75 LGO B3, 25 | 0.9410 | 0.445 | 212 | | 100 | 65 | 3.26 |
| Fuel 13 | HGO A6, 62 LGO B3, 14 LGO C1, 24 | 0.9599 | | 61 | | 98.5 | 61 | 1.00 |
| Fuel 14 | HGO A4, 80 LGO A3, 42 | 0.9273 | 0.4618 | 352 | 3.3 | 80 | 52.6 | 6.69 |
| Fuel 15 | HGO A4, 41 LGO A3, 47 LGO B1, 12 | 0.9083 | 0.3224 | 66.6 | 3.0 | 73 | 28.1 | 2.37 |
| Fuel 16 | HGO A4, 28 LGO A3, 65 LGO B1, 7 | 0.9084 | 0.2914 | 67.1 | 1.9 | 71 | 26.3 | 2.55 |
| Fuel 17 | HGO A1, 45.6 LGO B2, 38.44 LGO C3, 12.92 | 0.9376 | | 66.68 | 4.2 | 89 | 49 | 1.36 |
| Fuel 18 | HGO A1, 39.6 HGO B3, 7 LGO B2, 39.54 LGO C3, 11.22 | 0.9344 | | 48.33 | 8.5 | 81 | 34.8 | 1.39 |
| Fuel 19 | HGO A2, 16.4 LGO A2, 64.7 LGO B1, 18.9 | 0.9154 | 0.4300 | 23.3 | 2.8 | 71 | 23.0 | 1.01 |

TABLE 3

| FUEL | Blend Recipe, vol % | Density @ 15° C., g/cm$^3$ | Sulfur, wt % | Viscosity KV50, cSt | Wax content (wt %) | Wax Endpoint, ° C. (0% residual wax) | Wax Flow KV50 (predicted), cSt | Ratio of KV50 to Wax Flow KV50 |
|---|---|---|---|---|---|---|---|---|
| Fuel 20 | HGO A1, 31.8 HGO B3, 17 LGO B2, 40.07 LGO C3, 9.01 | 0.9328 | | 33.43 | 4.8 | 85 | 36.1 | 0.93 |
| Fuel 21 | HGO A1, 25.8 HGO B3, 20 LGO B2, 45.17 LGO C3, 7.31 | 0.9245 | | 20.57 | 7.3 | 81 | 29.0 | 0.71 |
| Fuel 22 | HGO A1, 17 LGO B2, 70 LGO C3, 10 | 0.8901 | 0.38 | 7.84 | 24.2 | 87 | 40 | 0.20 |
| Fuel 23 | HGO A1, 11 HGO B3, 6 LGO B2, 75 LGO C3, 6 | 0.8844 | 0.3 | 6.097 | 22.7 | 87 | 40 | 0.15 |
| Fuel 24 | HGO A2, 24 LGO A1, 65 LGO C2, 11 | 0.9095 | 0.507 | 46.9 | 4.4 | 95 | 53 | 0.88 |
| Fuel 25 | HGO A6, 15.2 LGO B3, 77.4 LGO B2, 2.7 | 0.8944 | 0.769 | 12.4 | 18.1 | 78 | 29 | 0.43 |
| Fuel 26 | HGO A6, 8.7 LGO B3, 87 LGO B2, 1.6 | 0.8767 | 0.28 | 8.885 | 19.3 | 72 | 24 | 0.37 |
| Fuel 27 | HGO A1, 42.6 LGO B2, 42.49 LGO C3, 12.07 | 0.9307 | | 43.89 | 4.4 | 89 | 44.4 | 0.99 |

Example 2

Figure 2:
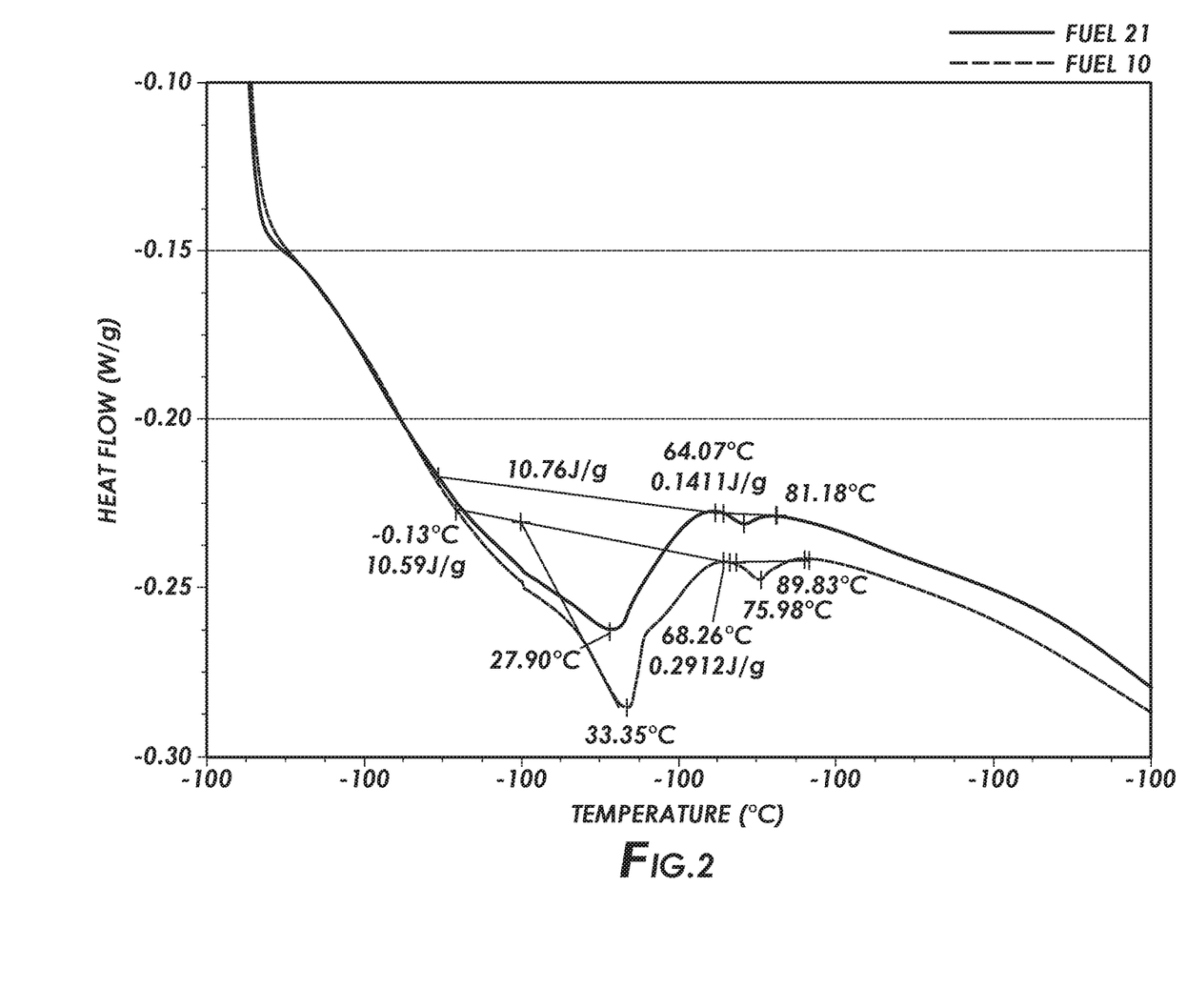
FIG. 2 illustrates a graph of temperature versus heat flow for two different marine fuel compositions.

In this example, the wax endpoint temperature of Fuels 10 and 21 were determined. To determine the wax endpoint temperature, differential scanning calorimetry ("DSC") was performed on each sample. The heat flow as a function of temperature from the DSC is provided as FIG. 2. The point where each curve reaches an asymptote and returns to the baseline is wax endpoint temperature. For Fuel 10, the wax endpoint temperature was identified to be 89° C. Assuming a minimum operational viscosity at 50° C. of 8 cSt, this minimum operational viscosity can be converted to a wax flow viscosity of 53.1 cSt at 50° C. As indicated in Table 2 above, the KV50 of Fuel 10 is 88.15 cSt. Because the ratio of the measured KV50 to the wax flow viscosity is greater than 1, the wax flow viscosity for Fuel 10 is acceptable. For Fuel 21, the wax endpoint temperature was identified to be 81° C. Assuming a minimum operational viscosity at 50° C. of 8 cSt, this minimum operational viscosity can be converted to a wax flow viscosity of 29.0 cSt at 50° C. As indicated in Table 3 above, the KV50 of Fuel 21 is 20.57 cSt. Because the ratio of the measured KV50 to the wax flow viscosity is less than 1, the wax flow viscosity for Fuel 21 is unacceptable.

While the invention has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

The invention claimed is:

1. A marine fuel composition having low sulfur content, the marine fuel composition having the following enumerated properties:
    a sulfur content of about 0.50% or less by weight of the marine fuel composition;
    a density at 15° C. of about 0.86 g/cm$^3$ to about 1.01 g/cm$^3$;
    a kinematic viscosity at 50° C. of about 10 centistokes to about 80 centistokes;
    a wax endpoint temperature of about 35° C. to about 130° C., and
    wherein the marine fuel composition comprises a heavy gas oil and a lighter gas oil, wherein at least 50 vol. % of the heavy gas oil boils at about 500° C. to about 750° C., and wherein at least 50 vol. % of the lighter gas oil boils at about 200° C. to about 550° C.

2. The marine fuel composition of claim 1, wherein the sulfur content is about 0.40 wt. % to about 0.49 wt. %.

3. The marine fuel composition of claim 1, wherein the density is about 0.86 g/cm$^3$ to about 0.95 g/cm$^3$.

4. The marine fuel composition of claim 1, wherein the heavy gas oil has a sulfur content of about 0.50 wt. % to about 3 wt. %, and wherein the lighter gas oil has a sulfur content of about 0.0001 wt. % to about 0.05 wt. %.

5. The marine fuel composition of claim 1, wherein the heavy gas oil has a kinematic viscosity at 50° C. of about 30 centistokes or greater, and wherein the lighter gas oil has a kinematic viscosity at 50° C. of about 1 centistoke to about 30 centistokes.

6. The marine fuel composition of claim 1, wherein the heavy gas oil is present in an amount of about 1 vol. % to about 60 vol. %, and wherein the lighter gas oil is present in an amount of about 40 vol. % to about 99 vol. %.

7. The marine fuel composition of claim 1, wherein the heavy gas oil comprises a residual hydrocarbon fraction.

8. The marine fuel composition of claim 1, wherein the marine fuel composition comprises:
    a heavy gas oil having a sulfur content of about 0.50 wt. % to about 3 wt. % and a kinematic viscosity at 50° C. of about 200 centistokes or greater, wherein at least 50 vol. % of the heavy gas oil boils at about 500° C. to about 700° C.; and
    a lighter gas oil having a sulfur content of about 0.0001 wt. % to about 0.05 wt. % and a kinematic viscosity at 50° C. of about 1 centistoke to about 30 centistokes, wherein at least 50 vol. % of the lighter gas oil boils at about 300° C. to about 450° C.

9. The marine fuel composition of claim 1, wherein the marine fuel composition is a distillate marine fuel.

10. The marine fuel composition of claim 1, wherein the marine fuel composition is a residual marine fuel.

11. A method of blending marine fuel compositions, comprising:
    blending two or more hydrocarbon components to prepare a liquid fuel, wherein the liquid fuel has the following enumerated properties:
    a sulfur content of about 0.50% or less by weight of the marine fuel composition;
    a density at 15° C. of about 0.86 g/cm$^3$ to about 1.01 g/cm$^3$;
    a kinematic viscosity at 50° C. of about 10 centistokes to about 80 centistokes;
    a wax endpoint temperature of about 35° C. to about 130° C., and
    wherein the two or more hydrocarbon components comprise a heavy gas oil and a lighter gas oil, wherein at least 50 wt. % of the heavy gas oil boils at about 500° C. to about 750° C., and wherein at least 50 wt. % of the lighter gas oil boils at about 200° C. to about 550° C.

12. The marine fuel composition of claim 11, wherein the heavy gas oil has a sulfur content of about 0.50 wt. % to about 3 wt. %, wherein the lighter gas oil has a sulfur content of about 0.0001 wt. % to about 0.05 wt. %, wherein the heavy gas oil as a kinematic viscosity at 50° C. of about 30 centistokes or greater, wherein the lighter gas oil has a kinematic viscosity at 50° C. of about 1 centistokes to about 30 centistokes, wherein the heavy gas oil is present in an amount of about 1 vol. % to about 60 vol. %, and wherein the lighter gas oil is present in an amount of about 40 vol. % to about 99 vol. %.

* * * * *